United States Patent
So et al.

(10) Patent No.: US 9,913,129 B2
(45) Date of Patent: Mar. 6, 2018

(54) ANTENNA CONTROL SYSTEM AND ITS OPERATING METHOD

(71) Applicant: KMW Inc., Hwaseong, Gyeonggi-do (KR)

(72) Inventors: Sung Hwan So, Gyeonggi-do (KR); Myoung Sik Lee, Gyeonggi-do (KR); Dong Hun Lee, Gyeonggi-do (KR)

(73) Assignee: KMW INC., Hwaseong, Gyeonggi-do (KR)

( * ) Notice: Subject to any disclaimer, the term of this patent is extended or adjusted under 35 U.S.C. 154(b) by 0 days.

(21) Appl. No.: 15/133,888

(22) Filed: Apr. 20, 2016

(65) Prior Publication Data
US 2016/0316359 A1    Oct. 27, 2016

(30) Foreign Application Priority Data

Apr. 21, 2015  (KR) .................. 10-2015-0056165

(51) Int. Cl.
| | |
|---|---|
| H04W 8/22 | (2009.01) |
| H04B 7/04 | (2017.01) |
| H01Q 1/24 | (2006.01) |
| H04B 1/00 | (2006.01) |
| H01Q 3/08 | (2006.01) |
| H01Q 3/24 | (2006.01) |
| H04W 8/18 | (2009.01) |

(52) U.S. Cl.
CPC .............. *H04W 8/22* (2013.01); *H01Q 1/246* (2013.01); *H01Q 3/08* (2013.01); *H01Q 3/24* (2013.01); *H04B 1/00* (2013.01); *H04W 8/18* (2013.01); *H04B 7/04* (2013.01)

(58) Field of Classification Search
CPC ...... H04B 7/04; H04B 7/0408; H04B 7/0608; H04B 1/00; H04W 8/22; H04W 8/18; H01Q 3/08; H01Q 3/24; H01Q 1/246
See application file for complete search history.

(56) References Cited

U.S. PATENT DOCUMENTS

| | | | |
|---|---|---|---|
| 2005/0113047 A1* | 5/2005 | Kim | H01Q 3/005 455/136 |
| 2014/0022124 A1 | 1/2014 | Zimmermann et al. | |
| 2014/0287696 A1 | 9/2014 | Moon et al. | |

(Continued)

FOREIGN PATENT DOCUMENTS

| | | |
|---|---|---|
| EP | 2003731 A2 | 12/2008 |
| EP | 2897224 A1 | 7/2015 |

(Continued)

*Primary Examiner* — Daniel Lai
(74) *Attorney, Agent, or Firm* — Mintz Levin Cohn Ferris Glovsky and Popeo, P.C.; Kongsik Kim; Colleen H. Witherell (57) ABSTRACT

The present disclosure in some embodiments provides an antenna control system wherein multiple primaries perform selective communications with antenna line devices (ALDs) and its operation method. Some embodiments provide an antenna control system including a switching unit which is interconnected between at least one functional unit for controlling an antenna of a radio base station and a plurality of control devices for transmitting a control signal to the functional unit so as to control as well as power the functional unit, and is configured to selectively electrically connect any of the plurality of control devices to the functional unit.

18 Claims, 6 Drawing Sheets

(56) References Cited

U.S. PATENT DOCUMENTS

2015/0380806 A1* 12/2015 Wild .................... H01Q 1/12
                                                    343/906
2016/0135184 A1*  5/2016 Zavadsky ............. H04B 7/04
                                                    370/329

FOREIGN PATENT DOCUMENTS

GB           2518204 A      3/2015
WO    WO 2014042444 A1 *   3/2014  ............. H01Q 1/246

* cited by examiner

ANTENNA CONTROL SYSTEM AND ITS OPERATING METHOD

CROSS-REFERENCE TO RELATED APPLICATIONS

The present application is based on, and claims priority from, Korean Patent Application Number 10-2015-0056165, filed Apr. 21, 2015, the disclosure of which is incorporated by reference herein in its entirety.

TECHNICAL FIELD

The present disclosure in some embodiments relates to an antenna control system for base stations and its operation method. More particularly, the present disclosure in some embodiments relates to an antenna control system wherein multiple primaries perform selective communications with antenna line devices (ALDs) and to its operation method.

BACKGROUND

The statements in this section merely provide background information related to the present disclosure and do not necessarily constitute prior art.

Mobile radio antenna is installed with more and more functions that can be remotely queried or remotely controlled. Known applications of this kind include, for example, a remote electrical tilt (RET) device for electronic down tilt angle adjustment, a remote azimuth steering (RAB) device, a remote azimuth beamwidth (RAB), and the like.

Such units could not be interconnected because each antenna manufacturer has a proprietary control system for its antenna, but recent LTE (Long Term Evolution) wireless or radio base stations, etc. are frequently adopting AISG (Antenna Interface Standards Group) or 3GPP (3rd Generation Partnership Project) standards for controlling antennas. The AISG standard is the specifications standardized for ensuring the interoperability of the antennas with respect to their tilting control schemes.

Usually, a wireless base station antenna and its controlling RET device or such AISG device (AISG functional unit: Antenna Line Device or ALD) are placed in a high position, such as the top of a tower and a building roof. On the other hand, a wireless device for supplying power to the antenna or a control device (AISG control device: primary) can commonly be disposed at a lower position such as the bottom of the tower. Here, the control device transmits a control signal (RS485 standard signal) to an AISG device, and executes the control of the antenna by controlling the AISG device while supplying power to the AISG device.

According to the 3GPP or AISG standards, RET control is largely classified by, for example, a primary station and the secondary station. A mobile communication base station may be typically configured by an antenna system installed at a high position of a building, pole, etc., a base station main system installed on the ground, and a feeder cable connecting between the two, wherein the primary station may correspond to the base station main system, and the secondary station to the antenna system.

In such antenna systems, the antenna control apparatus has its wireless device output an RF signal which is a feed signal for supplying power to the antenna, has its AISG control device output an AISG signal composed of a direct current power for driving AISG units and their control signal. Then, a BS (base station) modem combines a modulated signal obtained by modulating the RF signal and AISG signal, and transmits the combined signal via the feeder cable to an antenna modem of the antenna system. The antenna system causes the antenna modem to separate the combined signal into the modulated signal and the RF signal, supply the antenna with the RF signal power after the separation, and provide the AISG devices with an output of the AISG signal composed of a direct current power and a control signal obtained from demodulating the modulated signal by a modem circuit (demodulation circuit) within the antenna modem.

SUMMARY

Some embodiments of the present disclosure provide an antenna control system for controlling an antenna of a radio base station based on a 3GPP or AISG (Antenna Interface Standards Group) protocol, including at least one functional unit configured to control the antenna of the radio base station, a plurality of control devices configured to transmit a control signal to the functional unit so as to control and power the functional unit, and a switching unit configured to be interconnected between the plurality of control devices and the at least one functional unit so as to selectively electrically connect any of the plurality of control devices to the functional unit. The antenna control system may further include a feeder cable configured to connect the plurality of control devices with the switching unit, to connect the switching unit with the functional unit, and to have control signal lines for transmitting the control signal and a power supply line for powering the functional unit.

Some embodiments of the antenna control system may further include one or more of the following features.

In some embodiments, upon determining that a vendor specific procedure initiated by the control device in an electrical connection with the functional unit (hereinafter abbreviated as a 'first control device') is completed, the switching unit is configured to take over the electrical connection with the functional unit to another control device. The vendor specific procedure is configured to be carried out between the first control device and the functional unit.

In some embodiments, the vendor specific procedure includes transmitting, performed by the first control device, an initiating message that contains information on a takeover to another control device, to the functional unit, and transmitting a response message of the functional unit in response to the initiating message, to the first control device.

In some embodiments, the initiating message includes a procedure code for indicating that the initiating message is in accordance with the vendor specific procedure, a vendor code for identifying a vendor, and a procedure identifier for indicating that the initiating message is about the takeover to another control device. In some embodiments, the switching unit is configured to select a control device to be electrically connected with the functional unit, based on the information on the port included in the initiating message.

In some embodiments, the response message includes a procedure code for indicating that the response message is in accordance with the vendor specific procedure, a vendor code for identifying a vendor, a procedure identifier for indicating that the response message is about the takeover to said another control device, and a response code (response OK) for indicating a successful reception of the initiating message.

In some embodiments, the switching unit is configured to be a type-free device-neutral unit with a communication pursuant to the AISG standard. For example, the control unit may be configured to bypass the switching unit, and perform a direct communication with the function unit by the 3GPP or AISG protocol.

In some embodiments, the switching unit may be configured to be implemented as a functional module in the functional unit.

The functional unit may include at least any one of a remote radio unit (RRU), an antenna integrated radio (AIR), a tower mounted amplifier (TMA) and a remote electrical tilting (RET) device, an alignment sensor device (ASD), a clock source (ACS), a geographic location sensor (GLS), a configurable power monitor (CPM), a temperature sensor (ATS), a remote azimuth beamwidth (RAB), a remote azimuth steering (RAS) and an eAntenna (RAE) device.

Another aspect of the present disclosure provides a switching unit interconnected between at least one functional unit for controlling an antenna of a radio base station and a plurality of control devices for transmitting a control signal to the functional unit so as to control and power the functional unit. Here, the switching unit includes at least one common terminal to which the functional unit is wired, a plurality of branch terminals to which the plurality of control devices is wired, a switch configured to selectively connect the common terminal to the plurality of branch terminals, a communication interface configured to support an AISG or 3GPP protocol connected to a side of the common terminal of the switch, and a control unit configured to be connected to the communication interface and to the switch, and to control the switch so as to selectively connect the common terminal to the plurality of branch terminals.

Yet another aspect of the present disclosure provides a method for operating a switching unit which is interconnected between at least one functional unit for controlling an antenna of a radio base station and a plurality of control devices for transmitting a control signal to the functional unit so as to control and power the functional unit, and is configured to selectively electrically connect any of the plurality of control devices to the functional unit. Here, the method includes monitoring control signals between the functional unit and the control device in an electrical connection with the functional unit, and upon determining that a vendor specific procedure initiated by the control device in an electrical connection with the functional unit is completed, taking over the electrical connection with the functional unit to another control device.

REFERENCE NUMERALS

| | |
|---|---|
| 100, 100a, 100b, 100-1~100-n: ALD (Antenna Line Device) | |
| 200, 200-1~200-2: Switching unit | |
| 300a, 300b, 300-1~300-m: Primary | 400-1, 400-2: Splitter |
| 31: Common terminal | 32: Switch |
| 33: Communication interface | 340: Control unit |
| 36a, 36b: Branch terminal | |

DETAILED DESCRIPTION

Exemplary embodiments of the present disclosure are described below with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Various terms such as first, second, A, B, (i), (ii), (a), (b), etc., are used solely for the purpose of differentiating one component from the other, but not to imply or suggest the substances, the order or sequence of the components. Throughout this specification, when a part "includes" or "comprises" a component, the part is meant to further include other components, not excluding thereof unless there is a particular description contrary thereto. The terms such as "unit", "module", and the like refer to units for processing at least one function or operation, which may be implemented by hardware, software, or a combination thereof. Throughout the specification, the Antenna Interface Standards Group (AISG) standard and the 3rd Generation Partnership Project (3GPP) standard (TS 25.460 to TS 25.466) are incorporated by reference. The above AISG standard is completely included in the 3GPP standard in its entirety, and functions defined in the 3GPP standard are similar to the AISG 2.0.

Some embodiments of the present disclosure seek to provide an antenna control system with multiple primaries performing selective communication with an ALD and a method for operating the antenna control system.

In the antenna control system according to some embodiments of the present disclosure, multiple control devices (i.e., primaries) share an antenna of the same base station and one or more functional units (i.e., Antenna Line Devices: ALDs) for executing the antenna control. Any one of the multiple primaries is under the control of a switching unit located between the multiple primaries and the ALDs, for exclusively controlling the ALDs. In particular, the antenna control system controls the antenna of the radio base station pursuant to the UTRAN Iuant interface of 3GPP TS or a communication protocol defined by AISG.

Figure 1A:
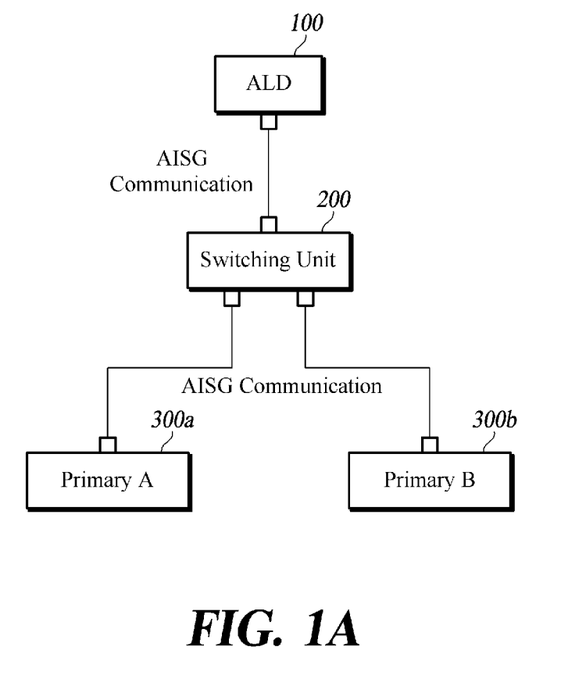
FIGS. 1A and 1B are schematic diagrams of antenna control systems according to some embodiments of the present disclosure.
Figure 1B:
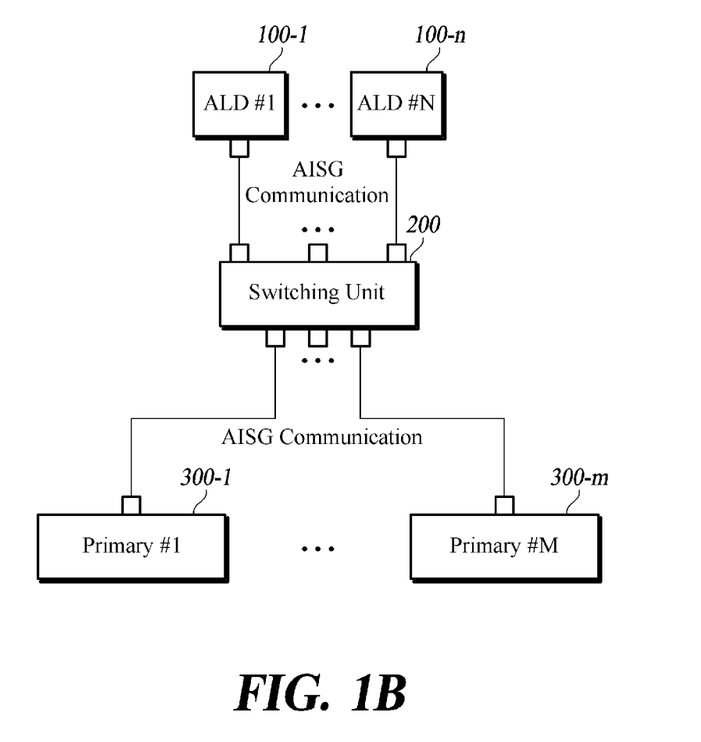

FIGS. 1A and 1B are schematic diagrams of antenna control systems according to some embodiments of the present disclosure.

Referring to FIG. 1A, the antenna control system includes an ALD 100 including a plurality of functional units for executing control of an antenna of a radio base station, a switching unit 200, and a plurality of primaries 300a, 300b for transmitting a control signal to the ALD 100 and thereby controlling as well as powering thereof, wherein the switching unit 200 is interposed between the plurality of primaries 300a, 300b and the ALD 100. The ALD 100, multiple primaries 300a, 300b and the switching unit 200 are interconnected via a feeder cable having control signal lines for transmitting the control signal and a power supply line for the power supplying. Further, there may be a plurality of ALDs 100 included in the antenna control system, when they may be structured by daisy chain connections. The antenna control system may include any of a variety of ALDs such as a remote radio unit (RRU), antenna integrated radio (AIR), tower mounted amplifier (TMA) and remote electrical tilting (RET) device, alignment sensor device (ASD), clock source (ACS), geographic location sensor (GLS), configurable power monitor (CPM), temperature sensor (ATS), remote azimuth beamwidth (RAB), remote azimuth steering (RAS) and eAntenna (RAE) among others.

The switching unit 100 selectively and electrically connects any one of the plurality of primaries 300a, 300b to the ALD 100. The switching operation for the selective connection to the ALD 100 is triggered by a primary takeover protocol that is initiated by the connected primary 300a or 300b. For example, the switching unit 200 monitors the control signals between the primaries and their interconnected ALD, and upon determining the completion of a primary takeover procedure in accordance with a certain protocol that is initiated by the connected primary, the switching unit 200 disconnects the connected primary from the functional unit and establishes a connection to the ALD 100 associated with another Primary 100.

Here, the switching unit 200 is a type-free device-neutral unit with a communication protocol pursuant to the AISG or 3GPP standard. Therefore, the primaries 300a, 300b are considered to have no switching unit 200, they perform direct communications with the ALD 100 in accordance with the above protocol. Similarly, the ALD 100 is treated as having no switching unit 200, and it communicates directly with the primaries 300a, 300b in accordance with the above protocol. In some embodiments, the device type may be the AISG ALD tower mounted amplifier (TMA) and remote electrical tilting (RET) device, ASD, ACS, GLS, CPM, ATS, RAB, RAS and RAE.

The primaries 300a, 300b may bypass (i.e. ignore) the switching unit 200 to carry out direct communications with the ALD 100 in accordance with a communication protocol of the above 3GPP or the AISG standard. This facilitates to perform communications pursuant to the above standards or the power supplying more stably.

FIG. 1A illustrates the antenna control system having a single ALD 100 and two primaries 300a, 300b, although other embodiments may provide antenna control systems implemented with a plurality of ALDs and a plurality of primaries. For example, an antenna control system illustrated in FIG. 1B includes a plurality of ALDs 100-1, 100-2, . . . 100-n for executing control of a plurality of antennas, a switching unit 200, and a plurality of primaries 300-1, 300-2, . . . 300-m for transmitting a control signal selectively to one of the plurality of ALDs 100-1, 100-2, . . . 100-n and thereby controlling as well as powering thereof, wherein the switching unit 200 is interposed between the plurality of primaries 300-1, 300-2, . . . 300-m and the plurality of ALDs 100-1, 100-2, . . . 100-n.

On the other hand, FIGS. 1A and 1B illustrate the switching unit 200 as a separate object independent of the ALD, although the switching unit 200 may be implemented in some other embodiments as one functional module in the ALD so that it operates in accordance with control signals of at least one CPU provided to the ALD.

Figure 2:
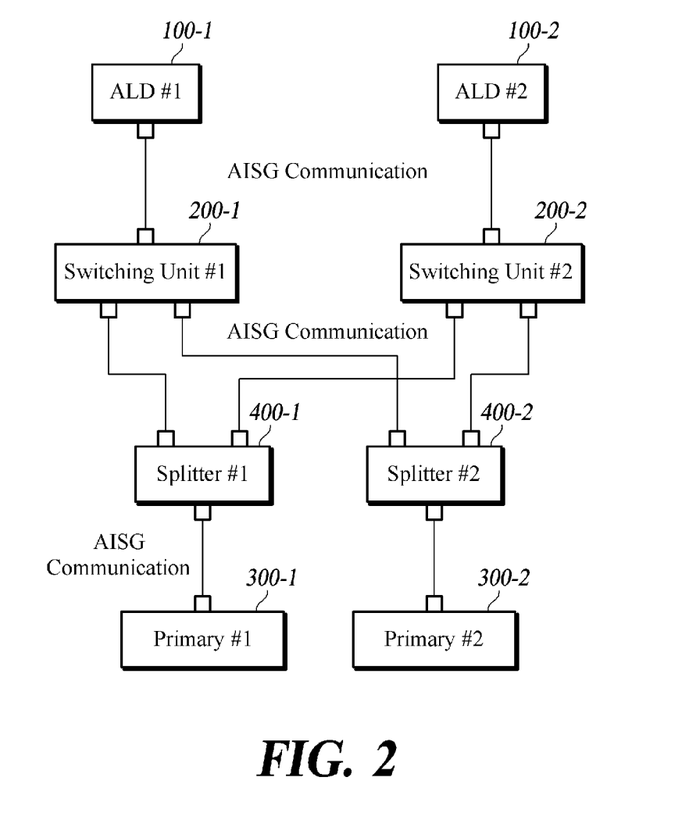
FIG. 2 is a schematic diagram of an antenna control system according to another embodiment of the present disclosure.

FIG. 2 is a schematic diagram of an antenna control system according to another embodiment of the present disclosure.

In the antenna control system according to some embodiments, multiple primaries 300-1, 300-2 share at least two antennas and at least two ALDs 100-1, 100-2 for controlling the antennas. Under the control of switching units 200-1, 200-2 located between the multiple primaries 300-1, 300-2 and the ALDs 100-1, 100-2, one of the multiple primaries 300-1, 300-2 exclusively controls the ALDs 100-1, 100-2. To this end, a splitter 400-1 is interposed between the primary 300-1 and the switching unit 200-1, and a splitter 400-2 is interposed between the primary 300-2 and the switching unit 200-2. The splitters 400-1 and 400-2 respectively bifurcate the feeder cables connected with the primaries 300-1, 300-2 to connect the furcated feeder cables to the switching units 200-1, 200-2 leading to the respective ALDs 100-1, 100-2. Here, the splitters 400-1 and 400-2 are free of a device type with a communication protocol pursuant to the AISG or 3GPP standard as are the switching units 200-1, 200-2. FIG. 2 illustrates a pair of the ALDs 100-1, 100-2, a pair of the switching units 200-1, 200-2, a pair of the splitters 400-1, 400-2 and a pair of primaries 300-1, 300-2 for the purpose of simplicity, although the respective units may be variously combined and/or the switching unit and the splitter may have terminals of different numbers from those illustrated.

Figure 3:
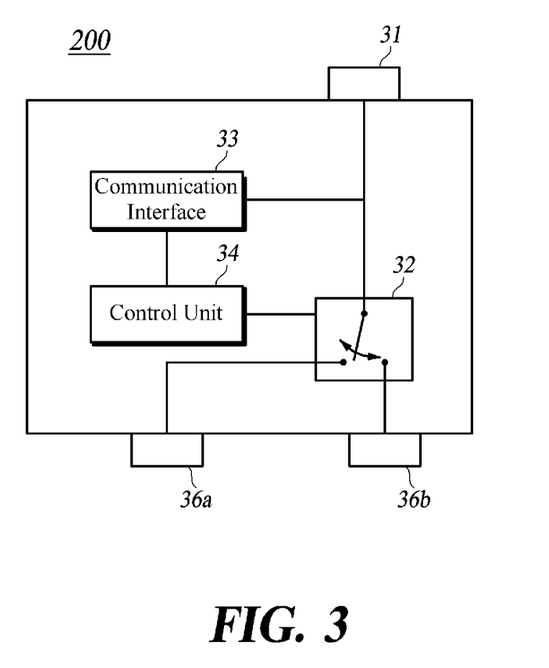
FIG. 3 is a schematic diagram of a configuration of a switching unit according to some embodiments of the present disclosure.

FIG. 3 is a schematic diagram of a configuration of a switching unit 200 according to some embodiments of the present disclosure.

The switching unit 200 includes a common terminal 31 to which the ALD 100 is connected via a AISG cable, and separate branch terminals 36a, 36b to which the respective primaries are connected via the AISG cable. FIG. 3 illustrates two branch terminals 36a, 36b, although it should be understood that three or more branch terminals may be provided in the switching unit 200 in some embodiments. The switching unit 200 further includes a switch 32 for connecting the common terminal 31 selectively to the multiple branch terminals 36a, 36b, a communication interface 33 that supports the AISG or 3GPP protocol which is connected to the side of the common terminal 31 of the switch 32, and a control unit 34 connected to the communication interface 33 and to the switch 32. The switch 32 may have a plurality of ports for selectively connecting the common terminal 31 to the plurality of branch terminals 36a, 36b.

To selectively connect the common terminal 31 to the plurality of branch terminals 36a, 36b, the control unit 34 controls the switch 32. Taking over by the switch 32 is triggered by a primary takeover procedure initiated by the primaries connected to the branch terminal 36a or 36b in connection with the common terminal 31. A particular protocol as mentioned above may be configured based on the vendor specific procedure as defined by the 3GPP standard. For example, the control unit 34 monitors, via the communication interface 33, control signals between the interconnected common terminal 31 (or ALD of its connected antenna) and the branch terminal (or its connected primary). Upon confirming the completion of the predetermined vendor specific procedure initiated by the connected primary, the control unit 34 controls the switch 32 so as to disconnect the primary from its connected ALD and to establish a connection of another primary to that ALD.

Hereinafter, with reference to FIGS. 4 and 5, a description will be provided on a primary takeover procedure of an antenna control system according to some embodiments of the present disclosure.

Figure 4:
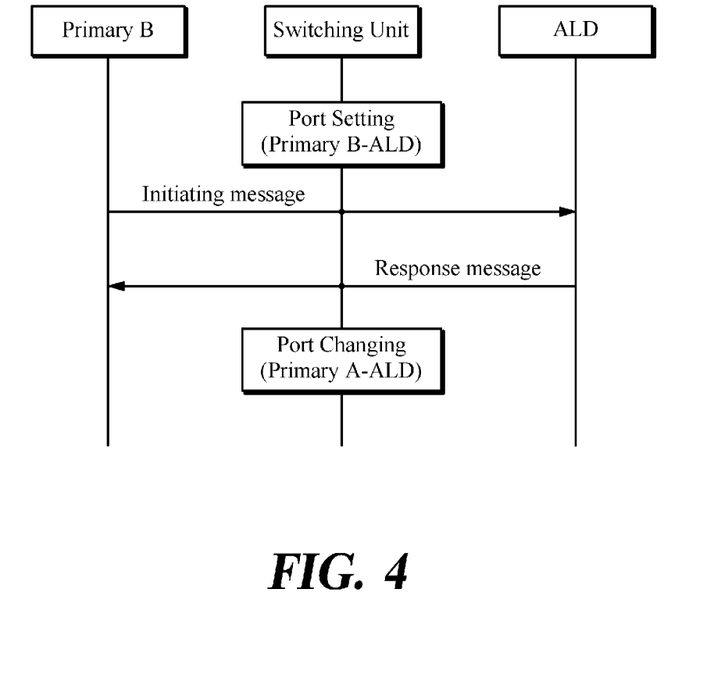
FIG. 4 and FIG. 5 are flowcharts of methods for operating an antenna control system according to some embodiments of the present disclosure.

FIG. 4 is a flowchart of a primary takeover procedure for switching the control of the ALD by primary B to the control of the ALD by primary A with primary B electrically connected to the ALD.

When primary B, which is electrically connected to the ALD, is to pass control of the ALD to primary A, it sends an initiating message to the ALD via a switching unit. Table 1 below illustrates the initiating message for starting the primary takeover procedure based on the vendor specific procedure prescribed by the 3GPP standard (for example, 3GPP TS 25.466).

TABLE 1

| CMD | Vendor Code | Vendor specific data |
|---|---|---|
| 0x90 | 0x4B [K], 0x4D [M] | 0xA0 [Procedure Identifier], 0x01 [Primary A Port Number] |

As shown in Table 1, the initiating message may include a procedure code (CMD) for indicating that the message is in accordance with the vendor specific procedure, a vendor code for identifying the vendor, and a procedure identifier for indicating that the initiating message is about changing the electrical connection to the ALD to that with another primary. The initiating message may further include information on a port to which another primary (i.e., primary A) is connected before it makes a subsequent electrical connection with the ALD.

Upon receiving the initiating message from primary B, the ALD sends a response message to the initiating message to primary B via the switching unit. Table 2 below illustrates the response message for initiating the primary takeover procedure based on the vendor specific procedure prescribed by the 3GPP standard (for example, 3GPP TS 25.466)

TABLE 2

| CMD | Vendor specific data |
|---|---|
| 0x90 | 0x4B [K], 0x4D [M], 0x00 [Response OK], 0xA0 [Procedure Identifier] |

As shown in Table 2, the response message may include a procedure code for indicating that the message is in accordance with the vendor specific procedure, a vendor code for identifying the vendor, a response code (response OK) for indicating a successful reception of the initiating message, and a procedure identifier for indicating that the response message is about the primary takeover.

The switching unit relays the response message sent from the ALD to primary B, and then change the port to another one to which primary A is connected.

Figure 5:
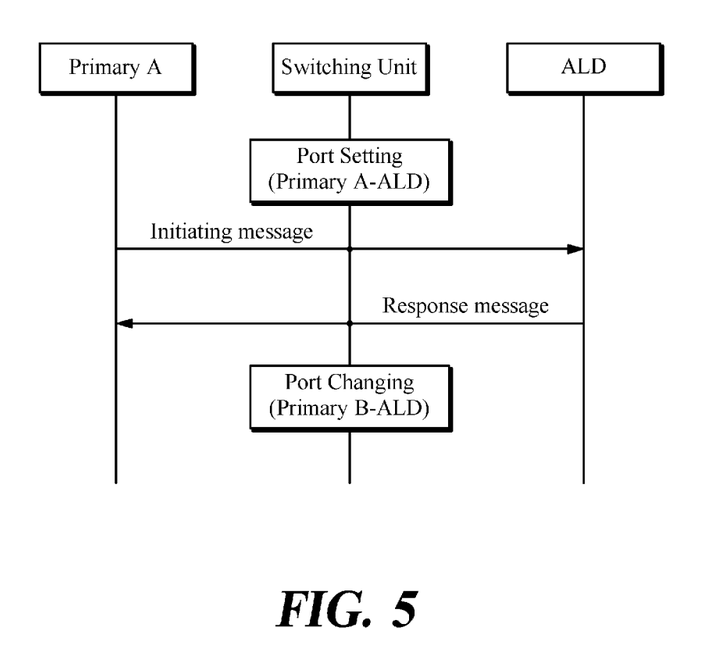

FIG. 5 is a flowchart of a primary takeover procedure for switching the control of the ALD by primary A to the control of the ALD by primary B with primary A electrically connected to the ALD. Specific procedures correspond to those of FIG. 4, and the initiating message transmitted by primary A and the response message of ALD are illustrated respectively in the following Tables 3 and 4.

TABLE 3

| CMD | Vendor Code | Vendor specific data |
|---|---|---|
| 0x90 | 0x4B [K], 0x4D [M] | 0xA0 [Procedure Identifier], 0x02 [Primary B Port Number] |

TABLE 4

| CMD | Vendor Code | Vendor specific data |
|---|---|---|
| 0x90 | 0x4B [K], 0x4D [M] | 0xA0 [Procedure Identifier], 0x02 [Primary B Port Number] |

As illustrated in Table 3, the initiating message transmitted by primary A may contain information on a port for switching to primary B.

As explained above, according to some aspects of the present disclosure, a plurality of primaries can share one or more antennas, and in particular, various control management schemes can be provided for enabling two or more operators to operate any particular operator's ALD.

Moreover, according to another aspect of the present disclosure, an operator can reduce the time and costs associated with resetting of the antenna control system in the field in that the operator can select a particular primary to communicate with the ALD based on the vendor specific procedure acceptable to the AISG 2.0 standard.

Although exemplary embodiments of the present disclosure have been described for illustrative purposes, those skilled in the art will appreciate that various modifications, additions and substitutions are possible, without departing from the various characteristics of the disclosure. Therefore, exemplary embodiments of the present disclosure have been described for the sake of brevity and clarity. Accordingly, one of ordinary skill would understand the scope of the disclosure is not limited by the explicitly described above embodiments but by the claims and equivalents thereof.

What is claimed is:

1. An antenna control system for controlling an antenna of a radio base station based on a 3GPP or AISG (Antenna Interface Standards Group) protocol, the antenna control system comprising:
   at least one functional unit configured to control the antenna of the radio base station;
   a plurality of control devices configured to transmit a control signal to the functional unit so as to control and power the functional unit; and
   a switching unit configured to be interconnected between the plurality of control devices and the at least one functional unit so as to selectively electrically connect any of the plurality of control devices to the functional unit,
   wherein, upon determining that a vendor specific procedure initiated by the control device in an electrical connection with the functional unit (hereinafter abbreviated as a 'first control device') is completed, the switching unit is configured to take over the electrical connection with the functional unit to another control device.

2. The antenna control system of claim 1, wherein the vendor specific procedure is configured to be carried out between the first control device and the functional unit.

3. The antenna control system of claim 2, wherein the vendor specific procedure comprises:
   transmitting, performed by the first control device, an initiating message that contains information on a takeover to said another control device, to the functional unit; and
   transmitting a response message of the functional unit in response to the initiating message, to the first control device.

4. The antenna control system of claim 3, wherein the initiating message comprises:

a procedure code for indicating that the initiating message is in accordance with the vendor specific procedure;

a vendor code for identifying a vendor; and a procedure identifier for indicating that the initiating message is about the takeover to said another control device.

5. The antenna control system of claim 4, wherein the initiating message further comprises an information on a port to which said another control device is connected.

6. The antenna control system of claim 5, wherein the switching unit is configured to select a control device to be electrically connected with the functional unit, based on the information on the port included in the initiating message.

7. The antenna control system of claim 3, wherein the response message comprises:

a procedure code for indicating that the response message is in accordance with the vendor specific procedure;

a vendor code for identifying a vendor;

a procedure identifier for indicating that the response message is about the takeover to said another control device; and a response code (response OK) for indicating a successful reception of the initiating message.

8. The antenna control system of claim 1, wherein the switching unit is configured to be implemented as a functional module in the functional unit.

9. The antenna control system of claim 1, further comprising a first control device configured to bypass the switching unit; and perform a direct communication with the function unit by the 3GPP or AISG protocol.

10. The antenna control system of claim 1, wherein the functional unit comprises at least any one of a remote radio unit (RRU), an antenna integrated radio (AIR), a tower mounted amplifier (TMA) and a remote electrical tilting (RET) device, an alignment sensor device (ASD), a clock source (ACS), a geographic location sensor (GLS), a configurable power monitor (CPM), a temperature sensor (ATS), a remote azimuth beamwidth (RAB), a remote azimuth steering (RAS) and an eAntenna (RAE) device.

11. A switching unit interconnected between at least one functional unit for controlling an antenna of a radio base station and a plurality of control devices for transmitting a control signal to the functional unit so as to control and power the functional unit, the switching unit comprising:

at least one common terminal to which the functional unit is wired;

a plurality of branch terminals to which the plurality of control devices is wired;

a switch configured to selectively connect the common terminal to the plurality of branch terminals;

a communication interface configured to support an AISG or 3GPP protocol connected to a side of the common terminal of the switch; and a control unit configured to be connected to the communication interface and to the switch, and to control the switch so as to selectively connect the common terminal to the plurality of branch terminals, wherein the control unit is configured to monitor control signals between the functional unit and the control device in an electrical connection with the functional unit; and upon determining that a vendor specific procedure initiated by the control device in the electrical connection with the functional unit, control the switch to take over the electrical connection with the functional unit to another control device.

12. The switching unit of claim 11, wherein the vendor specific procedure comprises:

transmitting, performed by the control device in the electrical connection with the functional unit, an initiating message that contains information on a takeover to said another control device, to the functional unit; and transmitting a response message of the functional unit in response to the initiating message, to the control device in the electrical connection with the functional unit.

13. The switching unit of claim 12, wherein the vendor specific procedure is configured to be carried out between the functional unit and the control device in the electrical connection with the functional unit.

14. The switching unit of claim 12, wherein the initiating message comprises:

a procedure code for indicating that the initiating message is in accordance with the vendor specific procedure;

a vendor code for identifying a vendor; and a procedure identifier for indicating that the initiating message is about the takeover to said another control device.

15. The switching unit of claim 14, wherein the initiating message further comprises an information on a port to which said another control device is connected.

16. The switching unit of claim 11, wherein the switching unit is configured to be a type-free device-neutral unit with a communication pursuant to the AISG or 3GPP protocol.

17. The switching unit of claim 11, wherein the switching unit is configured to be implemented as a functional module in the functional unit.

18. A method for operating a switching unit which is interconnected between at least one functional unit for controlling an antenna of a radio base station and a plurality of control devices for transmitting a control signal to the functional unit so as to control and power the functional unit, and is configured to selectively electrically connect any of the plurality of control devices to the functional unit, the method comprising:

monitoring control signals between the functional unit and the control device in an electrical connection with the functional unit; and upon determining that a vendor specific procedure initiated by the control device in an electrical connection with the functional unit (hereinafter abbreviated as a 'first control device') is completed, taking over the electrical connection with the functional unit to another control device.

* * * * *